(12) United States Patent
Krus

(10) Patent No.: US 10,842,308 B2
(45) Date of Patent: Nov. 24, 2020

(54) APPARATUS AND METHODS FOR CUTTING AVOCADOS

(71) Applicant: Chef'n Corporation, Seattle, WA (US)

(72) Inventor: Matthew Krus, Seattle, WA (US)

(73) Assignee: CHEF'N CORPORATION, Seattle, WA (US)

( * ) Notice: Subject to any disclaimer, the term of this patent is extended or adjusted under 35 U.S.C. 154(b) by 387 days.

(21) Appl. No.: 15/449,625

(22) Filed: Mar. 3, 2017

(65) Prior Publication Data

US 2017/0251857 A1 Sep. 7, 2017

Related U.S. Application Data

(60) Provisional application No. 62/303,867, filed on Mar. 4, 2016.

(51) Int. Cl.
*A47J 25/00* (2006.01)
*A47J 17/02* (2006.01)
*A47J 23/00* (2006.01)

(52) U.S. Cl.
CPC .............. *A47J 25/00* (2013.01); *A47J 17/02* (2013.01); *A47J 23/00* (2013.01)

(58) Field of Classification Search
CPC .............. A47J 17/02; A47J 23/00; A47J 25/00
USPC .... 30/278, 143, 147–151, 156, 123.5, 123.6
See application file for complete search history.

(56) References Cited

U.S. PATENT DOCUMENTS

| | | | | | |
|---|---|---|---|---|---|
| 1,442,577 | A | * | 1/1923 | Kugel | A47J 17/04 30/113.3 |
| 1,568,008 | A | * | 12/1925 | Thomas | A47J 25/00 30/113.3 |
| 1,628,087 | A | * | 5/1927 | Warren | A01D 1/00 30/123.5 |
| 1,802,990 | A | * | 4/1931 | Vossler | B26B 1/10 30/164 |
| 2,043,594 | A | * | 6/1936 | Frank | B26B 5/006 30/156 |
| 2,505,917 | A | * | 5/1950 | Schumacher | A47J 17/04 30/113.3 |
| 2,533,445 | A | * | 12/1950 | Finney | A22C 21/063 452/118 |

(Continued)

FOREIGN PATENT DOCUMENTS

| | | |
|---|---|---|
| CN | 202846399 U | 4/2013 |
| CN | 203524435 U | 4/2014 |

(Continued)

OTHER PUBLICATIONS

Chinese Search Report issued in application No. 201780015250.4 dated Mar. 6, 2020, pp. 2.

*Primary Examiner* — Ghassem Alie
*Assistant Examiner* — Bharat C Patel
(74) *Attorney, Agent, or Firm* — Tutunjian & Bitetto, P.C.

(57) ABSTRACT

A device for use in cutting open and removing the seed and flesh of an avocado is disclosed. The device includes a first handle member having a first end and a second end and a second handle member having a first end and a second end. The device also includes a first blade joining the first handle member and the second handle member together at their respective first ends and a second blade coupled to the first handle member and the second handle member at their respective second ends.

8 Claims, 7 Drawing Sheets

(56) References Cited

U.S. PATENT DOCUMENTS

| | | | | | |
|---|---|---|---|---|---|
| 2,540,393 | A | * | 2/1951 | Hawley | A47J 17/02 30/113.3 |
| 2,581,062 | A | * | 1/1952 | Albert | B26B 1/10 30/164 |
| 2,596,078 | A | * | 5/1952 | Prohaska | A22B 5/168 30/216 |
| 2,675,580 | A | * | 4/1954 | Augustine | B26D 3/30 452/30 |
| 2,725,630 | A | * | 12/1955 | Warring | B26B 3/02 30/299 |
| 2,803,876 | A | * | 8/1957 | Nelson | B26B 9/00 30/115 |
| 2,815,570 | A | * | 12/1957 | Engstrom | A47J 17/04 30/123.6 |
| 2,977,678 | A | * | 4/1961 | Swinden | B26B 1/02 30/155 |
| 2,986,813 | A | * | 6/1961 | De Vault | A47J 17/02 30/280 |
| 3,328,877 | A | * | 7/1967 | Brown | A47J 17/02 30/142 |
| 3,479,740 | A | * | 11/1969 | Clarke | A47J 17/04 30/142 |
| 3,888,005 | A | * | 6/1975 | Bagwell | B26B 9/02 30/286 |
| 4,649,645 | A | * | 3/1987 | Mez | A47J 17/04 30/123.7 |
| 4,658,456 | A | * | 4/1987 | Tsai | B25B 7/00 7/135 |
| D295,485 | S | * | 5/1988 | Ferrin | D7/673 |
| 4,960,419 | A | * | 10/1990 | Rosenberg | A61B 18/1402 30/296.1 |
| 5,002,213 | A | * | 3/1991 | Newton | A45F 5/14 224/232 |
| 5,052,108 | A | * | 10/1991 | Yang | A47J 17/02 30/113.1 |
| 5,115,565 | A | * | 5/1992 | Narlock | A47G 21/10 30/123.5 |
| 5,237,749 | A | * | 8/1993 | Henning | A47J 17/08 30/123.6 |
| 5,533,442 | A | * | 7/1996 | Tateno | A47J 17/02 30/114 |
| 5,613,431 | A | * | 3/1997 | Tateno | A47J 17/02 30/114 |
| 5,937,524 | A | * | 8/1999 | Hornsby | B26B 3/00 30/113.1 |
| 6,360,442 | B2 | * | 3/2002 | O'Brien | A47J 17/04 30/123.5 |
| 6,796,032 | B2 | * | 9/2004 | Horng | B26D 3/26 30/114 |
| 7,024,777 | B1 | * | 4/2006 | Bach | A22C 29/024 30/120.1 |
| 7,055,247 | B2 | * | 6/2006 | Kaposi | A47J 9/005 30/114 |
| 7,080,454 | B2 | * | 7/2006 | Holcomb | A47J 17/02 30/114 |
| 7,263,776 | B1 | * | 9/2007 | Shieh | A47J 25/00 30/279.6 |
| 7,421,786 | B2 | * | 9/2008 | Dorion | A47J 17/02 30/114 |
| D611,314 | S | * | 3/2010 | Eide | D7/694 |
| 8,726,799 | B2 | * | 5/2014 | Prommel | A47J 23/00 30/303 |
| 9,486,098 | B2 | * | 11/2016 | Wong | A47J 17/02 |
| 9,924,737 | B2 | * | 3/2018 | Tateno | A47J 17/02 |
| 2006/0010691 | A1 | | 1/2006 | Kaposi et al. | |
| 2006/0080844 | A1 | * | 4/2006 | Bauhuber | B26D 3/06 30/272.1 |
| 2008/0168659 | A1 | * | 7/2008 | Lazaroff | A47J 17/04 30/113.1 |
| 2009/0038486 | A1 | * | 2/2009 | Jordan | A47J 23/00 99/564 |
| 2014/0202005 | A1 | * | 7/2014 | Schoeman | A47J 43/288 30/113.3 |
| 2015/0135539 | A1 | * | 5/2015 | Harris | A47J 25/00 30/122 |

FOREIGN PATENT DOCUMENTS

| | | |
|---|---|---|
| CN | 103874438 B | 6/2014 |
| CN | 204635947 U | 9/2015 |
| CN | 103313633 A | 10/2015 |
| WO | 2006/014586 A1 | 2/2006 |

* cited by examiner

APPARATUS AND METHODS FOR CUTTING AVOCADOS

BACKGROUND OF THE INVENTION

Field of the Invention

The present disclosure is generally related to kitchen tools, and more particularly, to tools for cutting and removing the seed and flesh from an avocado.

Description of the Related Art

Devices and methods for use in cutting open and removing the seed and flesh of an avocado can make preparing food quicker, easier, cleaner and more enjoyable. A variety of devices have been developed over the years in an attempt to optimize this procedure.

BRIEF SUMMARY OF THE INVENTION

The present disclosure is directed to devices and methods for use in cutting open and removing the seed and flesh of an avocado. In one particular embodiment, a device for use in cutting open and removing the seed and flesh of an avocado incorporates a first handle member having a first end and a second end and a second handle member having a first end and a second end. The device also includes a first blade joining the first handle member and the second handle member together at their respective first ends and a second blade coupled to the first handle member and the second handle member at their respective second ends.

BRIEF DESCRIPTION OF THE SEVERAL VIEWS OF THE DRAWING(S)

Figure 1:
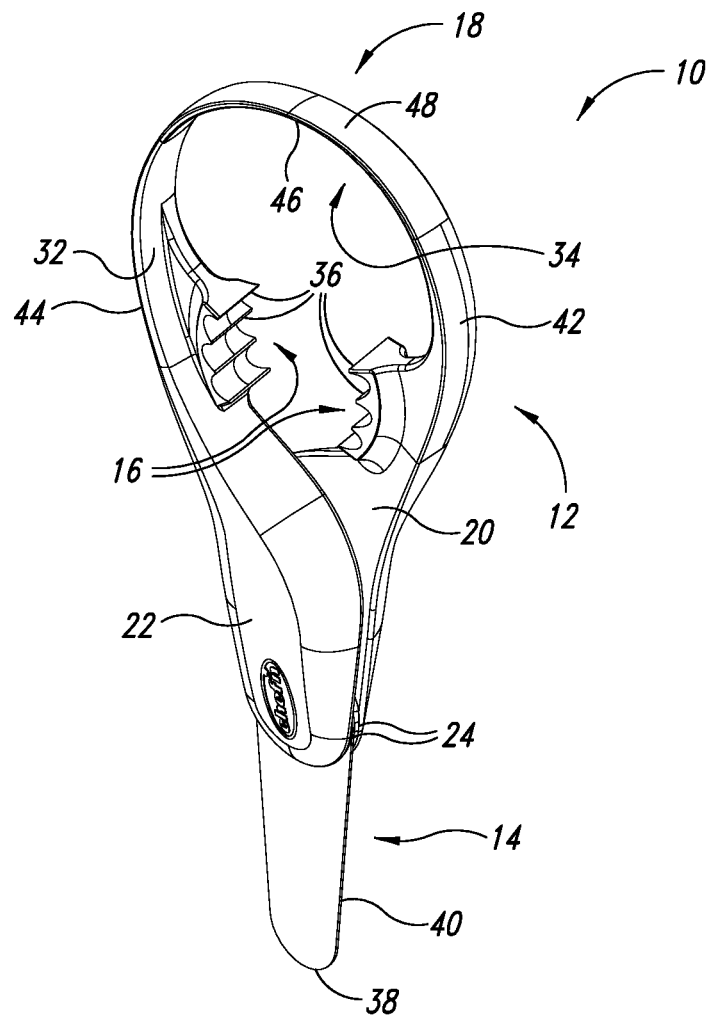
FIG. 1 is a top perspective view of an apparatus for cutting open and removing the seed and flesh of an avocado, according to one embodiment of the present disclosure.
Figure 2:
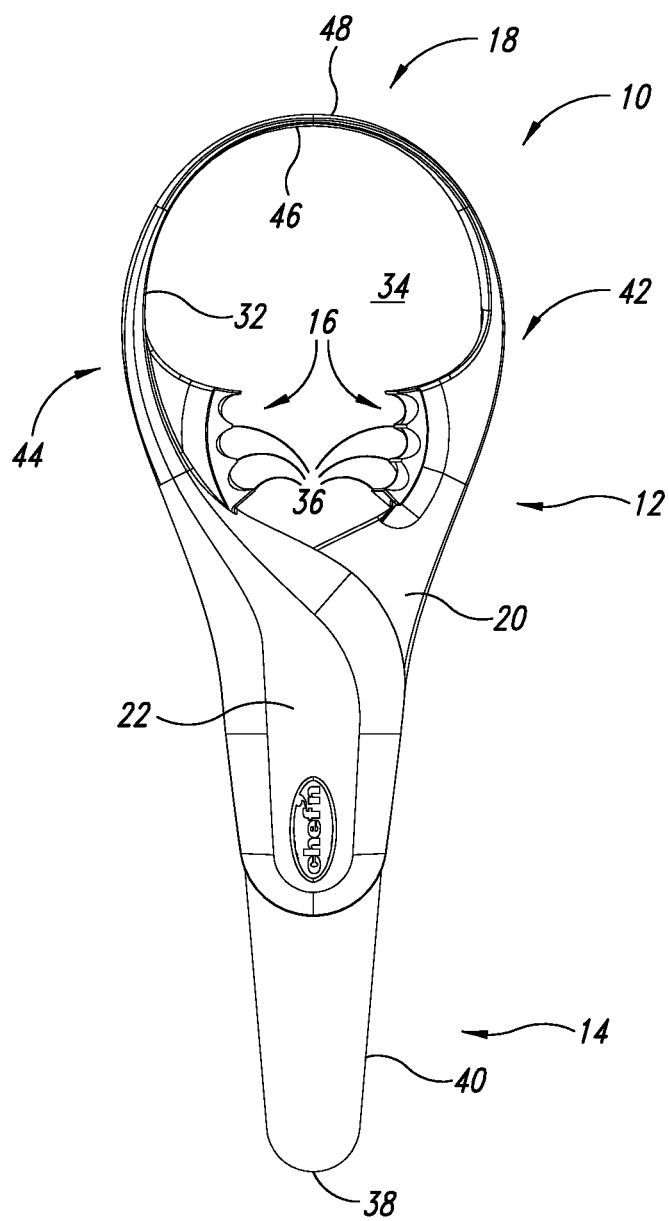
FIG. 2 is a front elevation view of the apparatus of FIG. 1.
Figure 3:
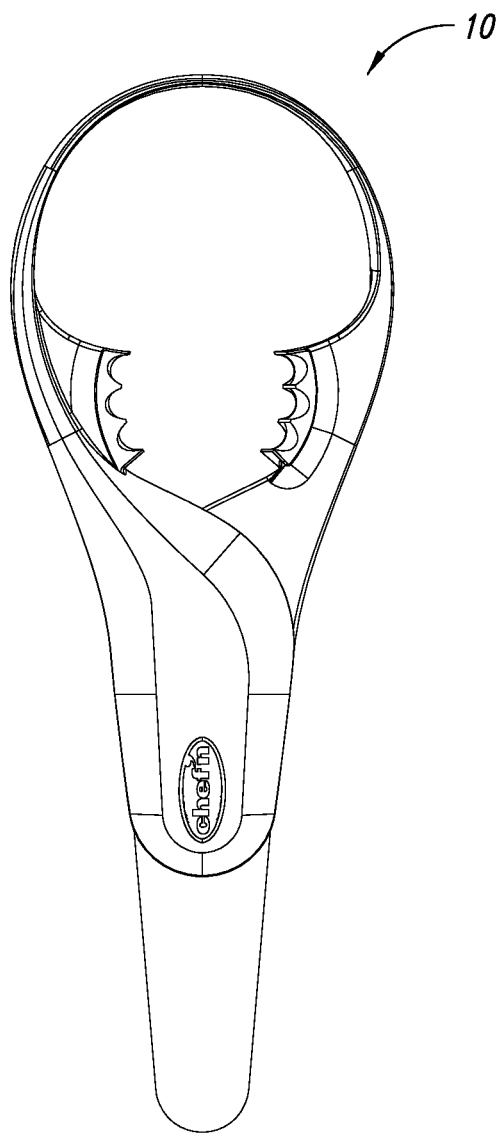
FIG. 3 is a back elevation view of the apparatus of FIG. 1.
Figures 4, 5:
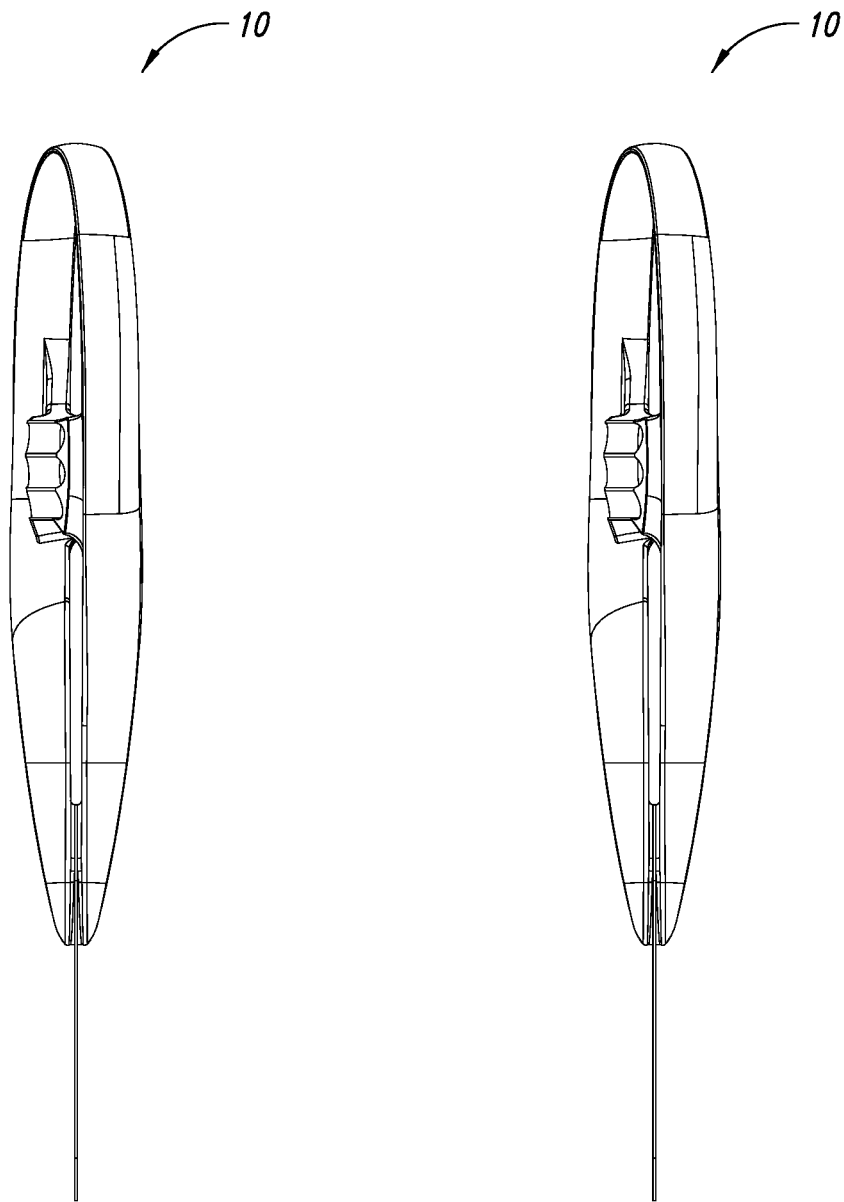
Figure 6:
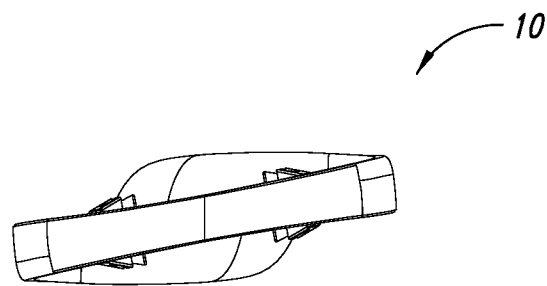
Figure 7:
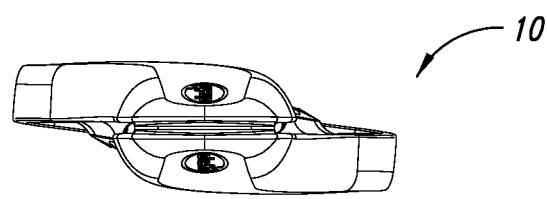
Figure 8:
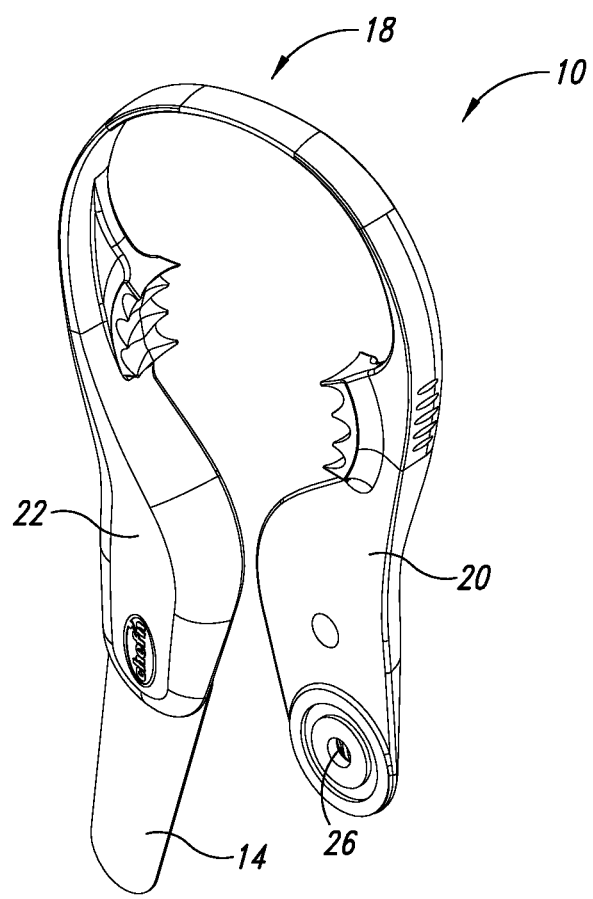
Figure 9:
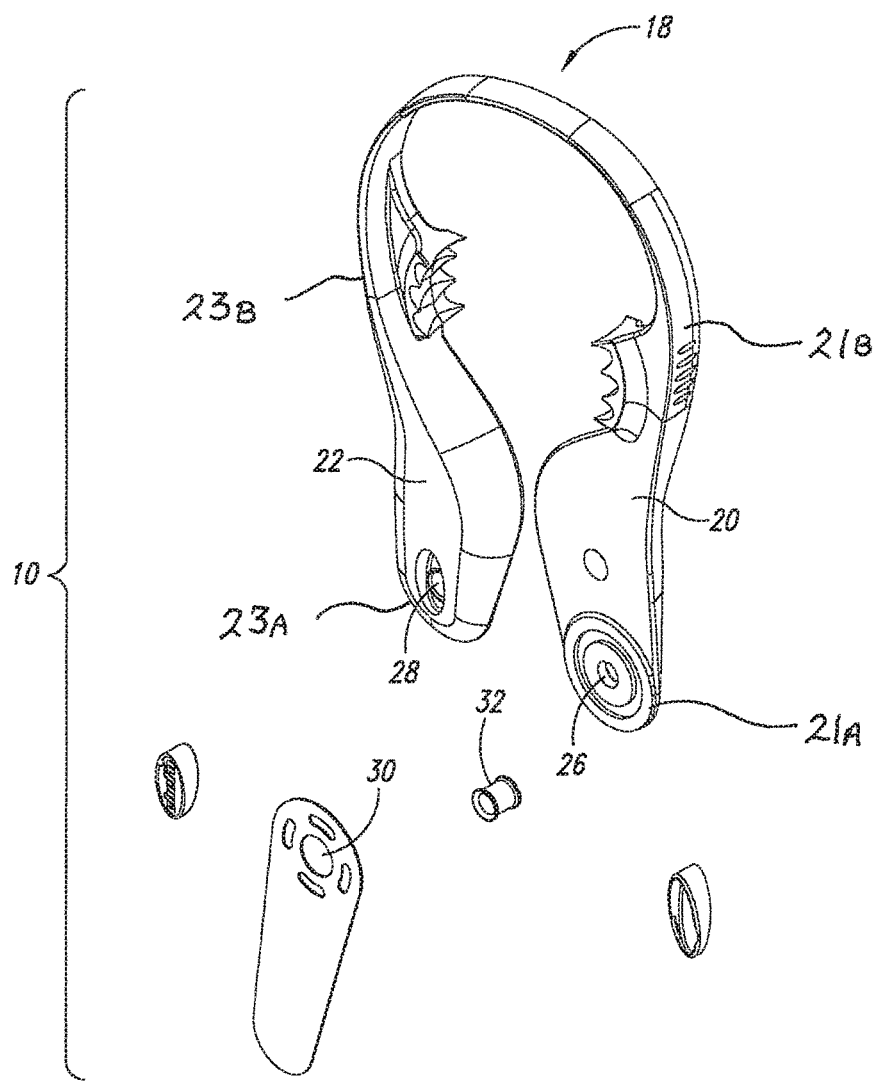

FIG. 4 is right side view of the apparatus of FIG. 1.
FIG. 5 is left side view of the apparatus of FIG. 1.
FIG. 6 is a top view of the apparatus of FIG. 1.
FIG. 7 is a bottom view of the apparatus of FIG. 1.
FIG. 8 is a top perspective view of the apparatus of FIG. 1, partially assembled.
FIG. 9 is an exploded view of the apparatus of FIG. 1.

DETAILED DESCRIPTION OF THE INVENTION

The following detailed description is directed toward apparatus and methods for cutting open and removing the seed and flesh of an avocado and other, similar food items. The detailed description and corresponding figures are intended to provide an individual of ordinary skill in the art with enough information to enable that individual to make and use embodiments of the invention. Such an individual, however, having read this entire detailed description and reviewed the figures, will appreciate that modifications can be made to the illustrated and described embodiments, and/or elements removed therefrom, without deviating from the spirit of the invention. It is intended that all such modifications and deviations fall within the scope of the invention, and the invention is limited only by construction of following claims.

Reference throughout this specification to "one embodiment" or "an embodiment" means that a particular feature, structure or characteristic described in connection with the embodiment is included in at least one embodiment of the disclosed structures and/or methods. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 1-9 illustrate one particular embodiment of a device 10 for cutting open and removing the seed and flesh of an avocado or similar food items. The illustrated device 10 primarily comprises a handle 12 and a blade 14. The device 10 can be sized and shaped to comfortably fit in a user's hand. The user can use the device by holding the handle 12 in one hand and an avocado or similar food item in the other hand. In the illustrated embodiment, the handle 12 includes a set of jaws 16 and a second blade 18. In other embodiments, the outside shapes and dimensions of the device 10 can vary without deviating from the spirit of the invention.

The body of the handle 12 includes two integral handle members 20, 22 joined together at their respective second ends 21B and 23B, respectively to the second blade 18. The first handle member 20 includes a first half of a blade coupling 24 for coupling the blade 14 to a first end 21A of the first handle member and the second handle member 22 includes a second half of a blade coupling 24 for coupling the blade 14 to a first end 23A of the second handle member. As shown, for example, in FIGS. 8 and 9, when the body of the handle 12 is manufactured, it may be manufactured such that in a rest or undeformed position the two integral handle members 20, 22 the first handle member 20 is separated from the second handle member 22.

During the manufacturing process, the first handle member 20 and the second handle member 22 may be squeezed together such that an aperture 26 in the first handle member and an aperture 28 in the second handle member align with each other and with an aperture 30 in the blade 14. When the three apertures 26, 28, 30 are aligned, a rivet 32 or other fastener may be used to fasten the handle members 20, 22 to each other and the blade 14.

The blade 14 extends from the ends of the first and second handle members 20, 22. To use the blade, a user grips the handle 12 in one hand and the avocado in their other hand. The user then uses the tip 38 of the blade 14 to break through the skin of an avocado by pressing the tip 38 through the skin and flesh of the avocado until the tip 38 reaches the seed of the avocado. After initially breaking through the skin and flesh of the avocado, the user then uses the edge 40 of the blade 14 to cut through the flesh and skin of the avocado around the seed.

The flesh of an avocado is relatively soft and the skin of an avocado tears easily once it has been punctured. Therefore, the tip 38 and the edge 40 of the blade 14 may be dull or otherwise unsharpened. For example, the blade 14 may be made from stamped sheet metal. After stamping the sheet metal into the shape of the blade 40 the tip and edges of the blade may be deep burred to further ensure that there are no sharp edges on the blade. The dull blade also reduces the likelihood of a user injuring themselves by accidentally cutting themselves with the blade 14.

At this point in the process the avocado is in two halves, but the halves are held together by the seed. The user separates the halves of the avocado from each other by rotating each half of the avocado and opposite directions. When a user separates the two halves of the avocado from each other, the seed of the avocado is generally retained within one of the halves of the avocado. Instead of using a sharp knife or other sharp kitchen tool to remove the pit from the avocado the body of the handle 12 incorporates jaws 16.

The jaws 16 are located at an interior perimeter 32 of an aperture 34 formed by the body of the handle 12. The jaws 16 include one or more teeth 36. In use, the seed of the avocado is placed into the aperture 34 of the handle 12 between the opposing jaws 16. Then, the user squeezes the sides 42, 44 of the handle towards each other, which causes the teeth 36 of the jaws to grip the seed. Then, with a twisting motion wherein the flesh portion of the avocado is rotated in one direction, while the handle 12 and jaws 16 that are gripping the seed are rotated in an opposite direction, prying the seed free from the flesh of the half of the avocado.

In some embodiments, the teeth 36 may be integral with the jaws 16. In such embodiments, the teeth may be made of the same material as the jaws. In some embodiments, the teeth 36 may be metal, ceramic or another hard material and embedded into the jaws 16. For example, if the handle 12 is made in an injection molding process, then the injection molded plastic may be formed around and hold the metal or ceramic teeth in place.

After the seed is removed from the half of the avocado the flesh may then be removed from the skin of each half of the avocado, the second blade 18 may be used to remove the flesh from the skin of each half of the avocado. The blade 18 includes a cutting edge 46 that is configured to cut the flesh of the avocado from the skin. The blade 18 may be formed integrally with the first and second handle members 20, 22. In such an embodiment, the second blade 18 is a thin portion of material joining the first and second handle members 20, 22 together. The cutting edge 46 of the second blade 18 is rounded and may be dull such that it does not cut the hand of a person gripping and using the device 10.

The second blade 18 may be flexible such that the shape of the blade is configurable to match the shape and contours of the skin of an avocado. For example, a user may press against the sides 42, 44 of the handle 12 to change the shape of the second blade 18 such that the second blade 18 conforms to the shape of the skin of the avocado. The user may also press a top 48 of the second blade 18 against the skin of the avocado to conform the shape of the second blade 18 to the shape of the skin of the avocado. The user may then slide the second blade 18 from a first end of the avocado, along the skin to, a second end of the avocado to separate the flesh from the skin.

After separating the flash from the skin on both halves of the avocado a user may then use the first blade 14 to cut or chop the avocado or may otherwise prepare the avocado as they see fit.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for use in cutting open and removing the seed and flesh of an avocado, the device comprising:
    a handle having a two integral handle members made up of a first handle member having a first end and a second end and a second handle member having a first end and a second end, the first ends being connected to directly to each other in an overlapping configuration;
    a first blade fixedly positioned between both of the first ends of the first handle member and the second handle member; and
    a second flexible blade connecting the second end of the first handle member to the second end of the second handle member forming an arc, the second flexible blade being flexible such that the shape of the blade is configurable to match a shape and contour of a skin of an avocado; wherein the first blade is located at one end of the handle and the second flexible blade is positioned at an opposite end of the handle.

2. The device of claim 1, wherein the first handle member, the second handle member, and the second flexible blade are a unitary structure.

3. The device of claim 1, further comprising an aperture having an interior perimeter formed by the second blade, the first handle member, and the second handle member.

4. The device of claim 3, further comprising a set of jaws projecting inwardly from the interior perimeter of the aperture.

5. The device of claim 4, wherein the jaws comprise a first set of teeth projecting from the interior perimeter at the first handle member and a second set of teeth projecting from the interior perimeter at the second handle member.

6. The device of claim 5, wherein the first and second set of teeth are metal.

7. The device of claim 1, wherein the first blade includes a rounded cutting edge.

8. The device of claim 1, wherein the first handle member, the second handle member, and the first blade are a unitary structure.

* * * * *